United States Patent [19]
Nelson

[11] Patent Number: 5,366,327
[45] Date of Patent: Nov. 22, 1994

[54] TIEDOWN HITCH

[76] Inventor: Bergen Nelson, 1065 Northgate Dr., Willows, Calif. 95988

[21] Appl. No.: 15,231

[22] Filed: Feb. 9, 1993

[51] Int. Cl.⁵ ...................... B61D 45/00; B65D 63/16
[52] U.S. Cl. ...................... 410/96; 24/130; 24/129 A
[58] Field of Search ...................... 410/96–98, 410/100–101; 24/129 R, 129 A, 129 B, 130

[56] References Cited

U.S. PATENT DOCUMENTS

| | | | |
|---|---|---|---|
| 614,621 | 11/1898 | Palmer | 24/129 R |
| 1,433,024 | 10/1922 | Morrison | 24/129 R |
| 1,714,770 | 5/1929 | Finn | 24/129 R |
| 2,441,336 | 5/1948 | Sova | 24/129 R |
| 3,675,276 | 7/1972 | Nuse | 24/129 B |
| 4,774,742 | 10/1988 | Johnson | 24/129 R |
| 4,910,834 | 3/1990 | Minkler | 24/129 R |
| 4,939,820 | 7/1990 | Babcock | 24/129 R |
| 5,205,687 | 4/1993 | Boyland | 410/98 |
| 5,220,709 | 6/1993 | Boyland | 24/130 |
| 5,223,246 | 7/1993 | Royball | 24/129 R |

Primary Examiner—Michael S. Huppert
Assistant Examiner—Gregory A. Morse
Attorney, Agent, or Firm—Harris Zimmerman

[57] ABSTRACT

A tiedown hitch for trucks and the like includes a medial body portion having a longitudinal axis, with a hook portion extending from one end and an eye portion extending from the opposed end. An interior hook surface is provided with an insert having a relatively large radius, so that the rope or line cannot be abraded or damaged by engagement with the hook. The hook insert may comprise a channel member bent into an arcuate shape and pressed onto the interior hook surface. Alternatively, the interior hook surface may be chamfered to provide a smooth arcuate exterior face to engage the rope or line secured about the hook portion. The eye portion includes a closed interior slot extending generally coaxially with the longitudinal axis and dimensioned to receive the rope or line therethrough. The medial body portion includes an arcuate closed slot therein, the slot defining a single finger that serves as a cleat to secure the rope or line passing thereabout. To use the tiedown hitch, one end of a rope is secured to a cleat on the truck, and passed through the eye slot and wrapped about the cleat finger. The rope is then passed back through the eye slot, so that the tiedown hitch is anchored immovably with respect to the cleat securing the rope. The free end of the rope is then extended over or about the load, and secured about a second cleat on the truck. The free end is then passed around the hook portion of the tiedown hitch, and returned to the second cleat. The rope extends in three plies from the hook to the second cleat, so that a mechanical advantage of three to one is established. The free end of the rope is pulled to tighten the rope to the desired extent, and the free end is then tied to the second cleat or another nearby fixed object.

7 Claims, 2 Drawing Sheets

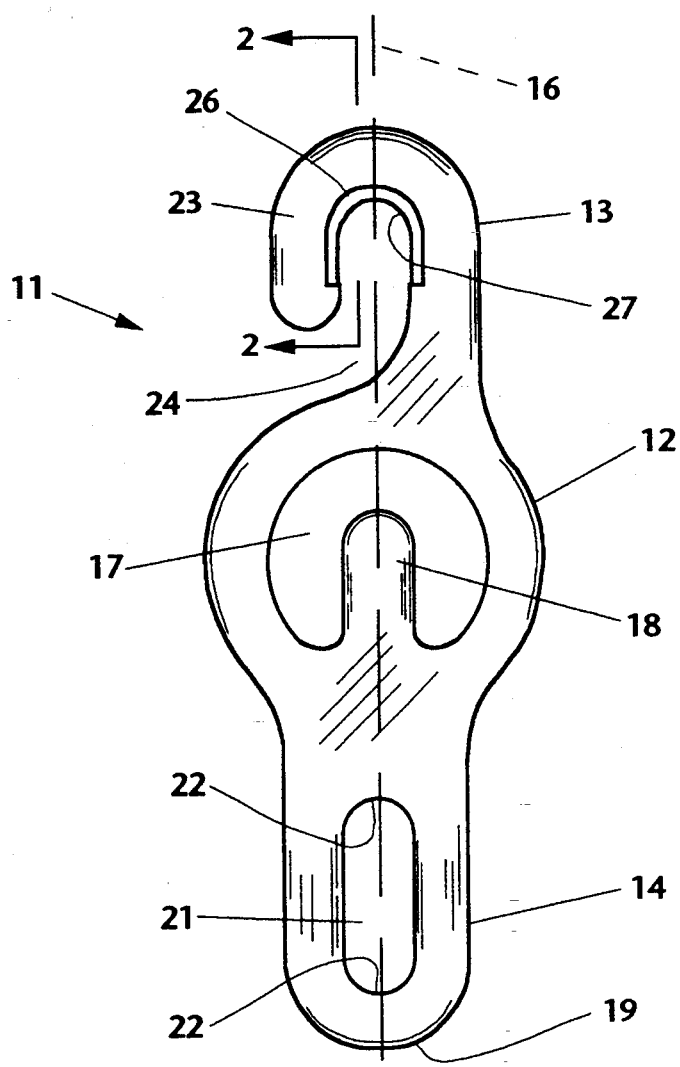
Figure_1
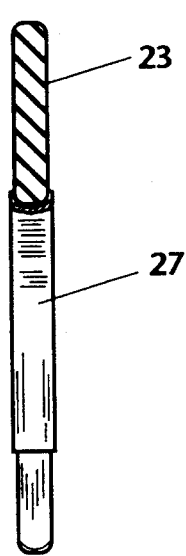
Figure_2
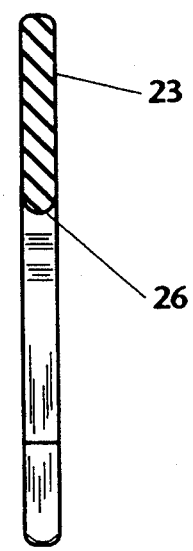
Figure_3

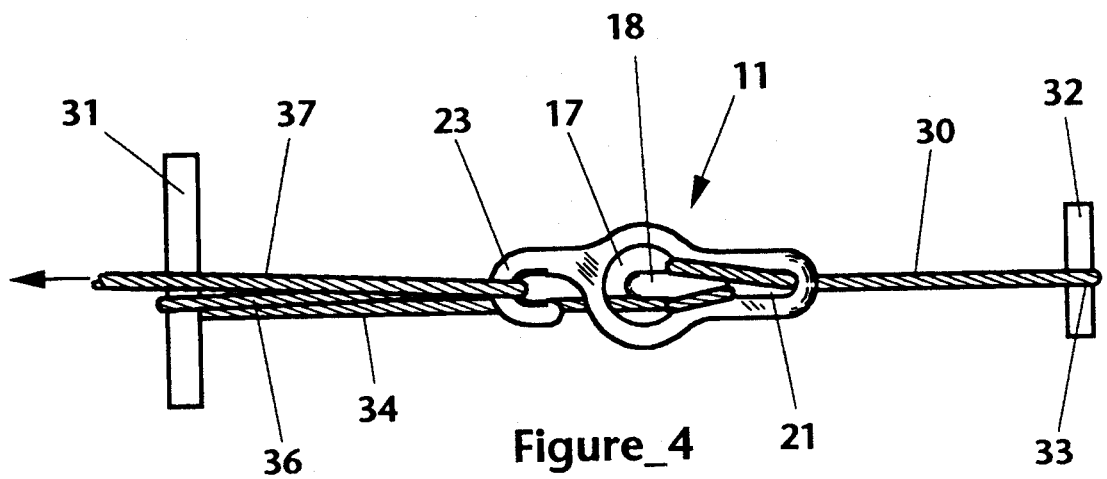
Figure_4
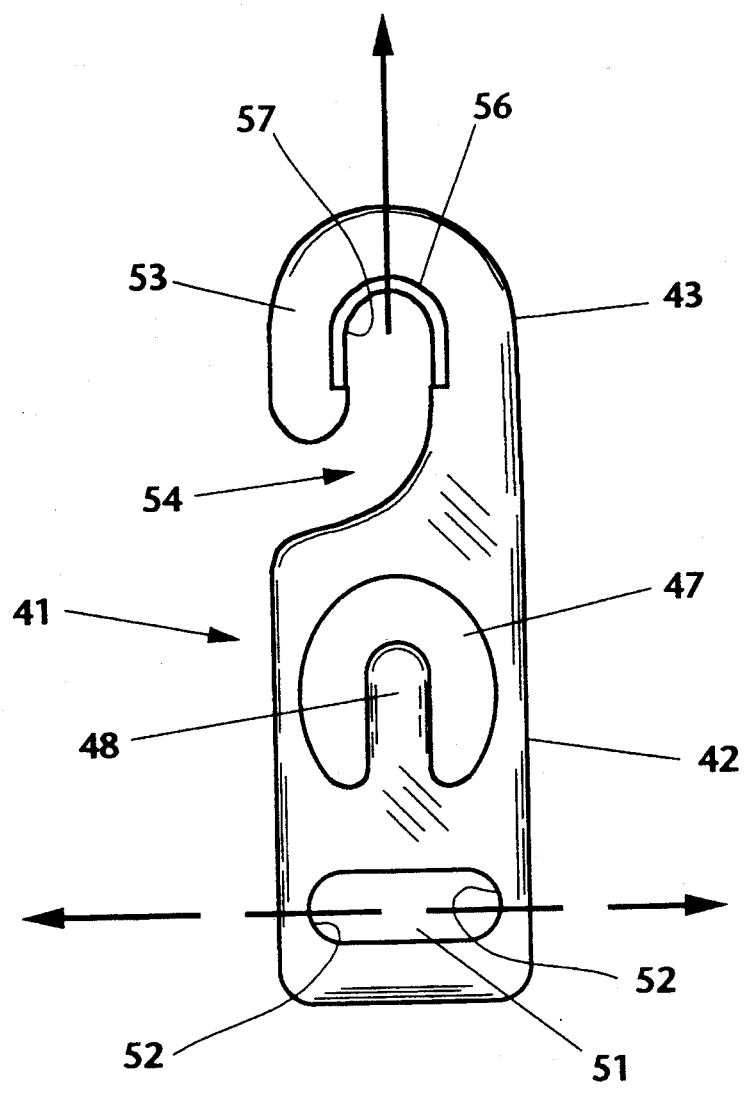
Figure_5

TIEDOWN HITCH

BACKGROUND OF THE INVENTION

In the field of transport of goods via truck, trailer, or rail car, it is necessary to secure the load to the vehicle to prevent load shifting. There are known in the prior art a great variety of load tiedown devices for securing loads to a frame or truck bed. Generally speaking, these devices are designed to use only ⅜ inch to ½ inch rope and are limited to a 500 lb. tensile load. Such devices usually provide a two to one mechanical advantage at most, and are required to be tied by various methods to jam cleats provided on the truck frame or truck bed.

Prior art tiedown hitches are usually three-dimensional devices that are relatively expensive to produce, considering the large numbers of the devices that are required in the transportation business. It is commonplace for tiedown hitches to be lost from truck loads as the loads are removed piecemeal, or to be dropped carelessly on the ground or pavement. Once a tiedown hitch has been run over by a truck, it is damaged beyond use, and must be replaced.

There is a need in the transport business for a tiedown hitch that is inexpensive to manufacture and cheap to replace. Moreover, the industry is in need of a tiedown device that provides a greater mechanical advantage to secure loads more firmly. It would also be advantageous to have a tiedown hitch that can be used in the absence of jam cleats on the truck frame or bed.

SUMMARY OF THE PRESENT INVENTION

The present invention generally comprises a tiedown hitch for trucks and the like that is inexpensive to produce yet embodies many advantages over similar prior art devices. The invention may be used with a wide range of rope sizes, produces a three to one mechanical advantage for more tightly securing loads to a truck, and does not require the use of jam cleats on the truck itself. Furthermore, the invention is formed in a planar configuration with no moving parts, so that the device is resistant to damage and easy to manufacture, and cannot wear out.

The tiedown hitch of the invention includes a medial body portion having a longitudinal axis, with a hook portion extending from one end and an eye portion extending from the opposed end. The hook portion includes an interior hook surface about which a rope or line is drawn to tighten the tiedown arrangement. The interior hook surface is provided with an insert having a relatively large radius, so that the rope or line cannot be abraded or damaged by engagement with the hook. The eye portion includes a closed interior slot extending generally coaxially with the longitudinal axis and dimensioned to receive the rope or line therethrough. The medial body portion includes an arcuate closed slot formed therein, the slot defining a single finger that serves as a cleat to secure the rope or line passing thereabout.

The tiedown hitch may be formed of tough planar material, such as 1/8 inch steel plate, and may be punched in a single operation by a suitably formed die. The hook insert may comprise a channel member bent into an arcuate shape and pressed onto the interior hook surface. Alternatively, the interior hook surface may be chamfered to provide a smooth arcuate exterior face to engage the rope or line secured about the hook portion.

An advantageous method of using the tiedown hitch of the invention is to secure one end of a rope to a cleat on the truck, and pass the rope through the eye slot and wrap the rope about the cleat finger of the medial body portion. The rope is then passed back through the eye slot, so that the tiedown hitch is anchored immovably with respect to the cleat securing the rope. The free end of the rope is then extended over or about the load, and secured about a second cleat on the truck. The free end is then passed around the hook portion of the tiedown hitch, and returned to the second cleat. Due to the fact that the rope extends in three plies from the hook to the second cleat, a mechanical advantage of three to one is established. The free end of the rope is pulled to tighten the rope to the desired extent, and the free end is then tied to the second cleat or another nearby fixed object.

In a further embodiment of the invention, the tiedown hitch includes a medial portion having an arcuate slot that defines a finger cleat, as described previously. An eye slot is formed in the medial body portion, and is aligned orthogonally to the longitudinal axis of the hitch. A hook portion extends from the end of the medial body portion opposed to the eye slot, and also includes an insert secured to the interior hook surface. In this embodiment the orientation of the eye slot permits the hitch to be secured to a cable, rope, or line extending generally orthogonally to the longitudinal axis of the device.

BRIEF DESCRIPTION OF THE DRAWING

FIG. 1 is a plan view of the tiedown hitch of the present invention.

FIG. 2 is a partial cross-sectional view, taken along line 2—2 of FIG. 1.

FIG. 3 is a partial cross-section view similar to FIG. 2, showing an alternative embodiment of the hook portion of the tiedown hitch.

FIG. 4 is a plan view showing the tiedown hitch of the invention employed for use in a typical truck load tiedown arrangement.

FIG. 5 is a plan view of an alternative embodiment of the tiedown hitch of the present invention.

DESCRIPTION OF THE PREFERRED EMBODIMENT

The present invention generally comprises a tiedown hitch device that is designed to secure a rope or line between two relatively fixed members with a tautness that is greater than is possible by mere manual manipulation. The device is adapted for use in securing together two objects, and one broad category of use is in securing loads for transport on trucks, rail cars, airplanes, and the like. However, the invention is not limited to such use.

With regard to FIG. 1, the tiedown hitch device 11 generally includes a medial body portion 12, a hook portion 13, and an eye portion 14. The hook portion 13 and eye portion 14 extend integrally from the body portion, and may advantageously be stamped or cut from a single planar piece of sheet or plate steel. The portions 13 and 14 extend from the body portion 12 along a nominal longitudinal axis 16.

The body portion 12 is generally configured as a generally circular, planar disc, and includes a U-shaped internal slot 17 formed therein. The slot 17 defines a finger cleat 18 which is provided for purposes to be described below. The eye portion 14 comprises a generally planar member extending from the body portion 12 in a common plane, the eye portion having a smoothly rounded distal end 19. Disposed medially in the eye portion 14 is an eye slot 21, which is provided with smoothly rounded interior end portions 22. The eye portion 14 and slot 21 extend coaxially with the axis 16.

The hook portion 13 extends from the end of the body portion 12 longitudinally opposed to the eye portion 14, and includes a U-shaped hook 23 extending in the same plane as the body portion. The hook 23 defines with the body portion a narrow opening 24 into which a rope or line may be introduced to be engaged about the hook 2.3. Joined to the interior surface 26 of the hook 23 is an insert 27. The insert 27 comprises a channel portion bent into a U-shape to conform to the interior surface 26 of the hook, and is secured thereto by press fit, spring fit, or the like. As shown in FIG. 2, the insert 27 provides a smoothly curved surface extending out of the common plate of the body portion, hook portion, and eye portion, the curved surface having a larger radius of curvature out of the plane than the interior hook surface 26 could have, so that rope or line secured about the hook 23 will slide over the interior surface with minimal friction and without abrasion. The interior hook surface 26 may be provided with an undercut portion to receive the insert 27. Alternatively, as shown in FIG. 3, the insert 27 may be eliminated, and the interior hook surface 26 may be chamfered to reduce friction and abrasion on a rope or line passing thereover.

With regard to FIG. 4, the tiedown hitch 11 may be used to secure a rope or line between two relatively fixed members with a tautness that is greater than attainable without the hitch or with prior art tiedown hitches. For example, one end 33 of a rope 30 may be tied to a fixed cleat 32, and the free end is passed through the eye slot 21 of the hitch 11 and wrapped 180° about the finger cleat 18. The rope is then passed back through the eye slot once again and turned about the inner end of the eye slot toward a distant fixed cleat 31. The engagement of the rope with the eye slot and finger cleat immobilizes the tiedown hitch 11 at a fixed distance from the cleat 32.

The rope portion 34 extending from the eye slot 21 to the distant cleat 31 is passed about the cleat 31 to define a rope portion 36 returning toward the tiedown hitch 11. The rope portion 36 is wrapped 180° about the hook 23 to define a rope portion 37 directed toward the cleat 31. The rope portion 31 may be pulled manually to tighten the engagement between the cleats 32 and 31, and then is tied off using conventional knots, hardware, or the like. It may be appreciated that the three rope plies extending from the cleat 31 to the tiedown hitch 11 determine that a three to one mechanical pulley advantage is established. Thus the tensile force applied manually to the rope portion 37 is multiplied by a factor of three, permitting the rope to be pulled taut to a degree not possible by manual effort alone.

It may be appreciated that the rope may be passed over or about a load that is to be secured to a truck bed, rail car bed, or the like, so that the load is secured firmly and temporarily to a structure. Furthermore, the tiedown hitch 11 may be secured to the rope at any fixed distance from the cleat 32, so that the three rope portions 34, 36, and 37 comprise the shortest possible lengths that are practical and minimize the amount of rope required to span the distance between the cleats.

With regard to FIG. 5, a further embodiment of the invention comprises a tiedown hitch device 41. The device 41 generally includes a medial body portion 42 and a hook portion 43, The hook portion 43 and body portion 42 extend integrally, and may advantageously be stamped or cut from a single planar piece of sheet or plate steel. The body portion 42 is generally configured as a generally rectangular, planar member, and includes a U-shaped internal slot 47 formed therein. The slot 47 defines a finger cleat 48 which is provided for purposes to be described below. Disposed at one end of the body portion 42 is an eye slot 51, which is provided with smoothly rounded interior end portions 52. It is significant to note that the slot extends orthogonally to the longitudinal axis of the device 41.

The hook portion 43 extends from the end of the body portion 42 longitudinally opposed to the eye slot 51, and includes a U-shaped hook 53 extending in the same plane as the body portion. The hook 53 defines with the body portion a narrow opening 54 into which a rope or line may be introduced to be engaged about the hook 53. Joined to the interior surface 56 of the hook 53 is an insert 57. The insert 57 is similar in configuration and function to the insert 27 of the device 11 described previously, and is provided so that rope or line secured about the hook 53 will slide over the interior surface with minimal friction and without abrasion. Likewise, the alternative embodiment of FIG. 3 may be combined with the embodiment of FIG. 5.

The tiedown hitch 41 is particularly adapted to be used in conjunction with a cable, wire, or rope extending orthogonally to the longitudinal axis of the hitch 41, so that a tiedown arrangement may be effected in a direction perpendicular to the cable, wire, or rope.

The embodiments of FIGS. 1 and 5 have been described as formed integrally of sheet or plate steel as a planar item for simplicity and economy. This configuration, together with the fact that there are no moving parts in the device, forms a tiedown hitch that is extremely tough and resistant to damage. Furthermore, it should be noted that the components may be fabricated separately and assembled, and that the device may be formed in a non-planar configuration; e.g., to conform to the surface of the load being secured. Likewise, the embodiments described herein are not limited to the tiedown arrangement of FIG. 4, but may be used with any convenient arrangement of cleats, rope, or line. Moreover, the embodiments described herein are not limited to use with rope, cable, or line, as described, but may be used with any string, twine, wire, or cordage that is sufficiently flexible and strong for the task at hand. The eye slot, finger cleat, and hook portions of the device are capable of functioning with a wide variety and size range of tiedown materials.

I claim:

1. A tiedown hitch for securing a rope under tension between two relatively fixed members, including:
    a medial body portion, a hook portion, and an eye portion;
    said hitch having a front face;
    said medial body portion including finger cleat means for securing the rope thereabout, said medial body portion, said hook portion, said eye portion, and said finger cleat means formed integrally in a planar member and extending in a common plate parallel to said front face;
    said hook portion including an elongated, arcuate hook;
    said eye portion including an eye slot for receiving the rope therethrough;

said hitch including a longitudinal axis extending in said common plane through said medial body portion and defining first and second opposed ends of said medial body portion, said hook portion extending from said first end of said medial body portion and said eye portion extending from said second end of said medial body portion in axial opposition to said hook portion;

said finger cleat means including an arcuate slot formed in said medial body portion, said arcuate slot having a closed-end, U-shaped conformation in said common plane and defining a finger cleat, said finger cleat disposed generally coaxially with said longitudinal axis and directed toward said hook portion.

2. The tiedown hitch of claim 1, wherein said hook portion includes an interior surface for engaging the rope thereabout, and further including fixed means for minimizing the sliding friction and abrasion of the rope about said interior surface of said hook portion.

3. The tiedown hitch of claim 2, wherein said fixed means includes an insert secured to said interior surface of said hook portion, said insert having a smoothly rounded surface disposed to impinge on the rope.

4. The tiedown hitch of claim 2, wherein said fixed means includes chamfered edges of said interior surface of said hook portion to define a smoothly rounded surface disposed to impinge on the rope.

5. The tiedown hitch of claim 1, wherein said eye slot comprises a closed slot having a major axis extending generally coaxially with said longitudinal axis.

6. The tiedown hitch of claim 1, wherein said eye slot comprises a closed slot having a major axis extending generally orthogonally to said longitudinal axis.

7. A tiedown arrangement for securing a rope under tension between two relatively fixed members, including:

a hitch having medial body portion, a hook portion, and an eye portion;

said hitch having a front face;

said medial body portion including finger cleat means for securing the rope thereabout, said medial body portion, said hook portion, said eye portion, and said finger cleat means formed integrally in a planar member and extending in a common plate parallel to said front face;

said hook portion including an elongated, arcuate hook;

said eye portion including an eye slot for receiving the rope therethrough;

said hitch including a longitudinal axis extending in said common plane through said medial body portion and defining first and second opposed ends of said medial body portion, said hook portion extending from said first end of said medial body portion and said eye portion extending from said second end of said medial body portion in axial opposition to said hook portion;

said finger cleat means including an arcuate slot formed in said medial body portion, said arcuate slot having a closed-end, U-shaped conformation in said common plane and defining a finger cleat, said finger cleat disposed generally coaxially with said longitudinal axis and directed toward said hook portion;

wherein one end of the rope is secured to one of the fixed members, the other free end of the rope is passed through said eye slot and secured about said finger cleat, thence passed back through said eye slot and extended to the other of the fixed members, thence passed about the other fixed member and extended to said hook portion, passed about said hook portion and returned to said other member and secured thereat, whereby a three to one mechanical pulley advantage is created by said tiedown hitch and the rope.

* * * * *